United States Patent
Wendt

[11] 3,900,260
[45] Aug. 19, 1975

[54] METHOD AND APPARATUS FOR MEASURING THE DISTANCE AND/OR RELATIVE ELEVATION BETWEEN TWO POINTS IN AN OPTO-ELECTRONIC MANNER

[75] Inventor: Gerhard Wendt, Kulmbach, Germany

[73] Assignee: MITEC Moderne Industrietechnik GmbH, Frieding-Herrsching, Germany

[22] Filed: Jan. 23, 1974

[21] Appl. No.: 435,936

[52] U.S. Cl. .................. 356/5; 356/1; 356/141; 356/152; 343/15
[51] Int. Cl. .................. G01c 3/08; G01b 11/26
[58] Field of Search .................. 356/1, 5, 141, 152; 343/15

[56] References Cited
UNITED STATES PATENTS

| | | | |
|---|---|---|---|
| 3,619,058 | 11/1971 | Hewlett et al. | 356/5 |
| 3,664,748 | 5/1972 | Bezu | 356/152 |
| 3,690,767 | 9/1972 | Missio et al. | 356/141 |
| 3,778,160 | 12/1973 | Wolcott | 356/5 |

Primary Examiner—Maynard R. Wilbur
Assistant Examiner—S. C. Buczinski
Attorney, Agent, or Firm—W. G. Fasse; W. W. Roberts

[57] ABSTRACT

The distance between a target and a measuring point is measured by optical and electronic elements, forming an opto-electronic circuit arrangement, wherein a light beam modulated by a first frequency signal is divided to produce a measuring beam and a reference beam. The measuring beam reflected from the target and the reference beam are supplied through switching means to a light sensitive detector in accordance with a predetermined switching function. The output signal of the detector is supplied together with a second frequency signal to a first mixing stage to form a first intermediate frequency signal. A further mixing stage mixes a third frequency signal with the first modulating frequency signal to form a second intermediate frequency signal. Both intermediate frequency signals are supplied to signal evaluating and indicating circuit means. By measuring the distance to the same target twice with regard to two definitely spaced retroreflectors and by employing a computer in the signal evaluating it is possible to also ascertain and digitally indicate the relative elevation and the base distance between the measuring point and the target without any angular measurement.

26 Claims, 3 Drawing Figures

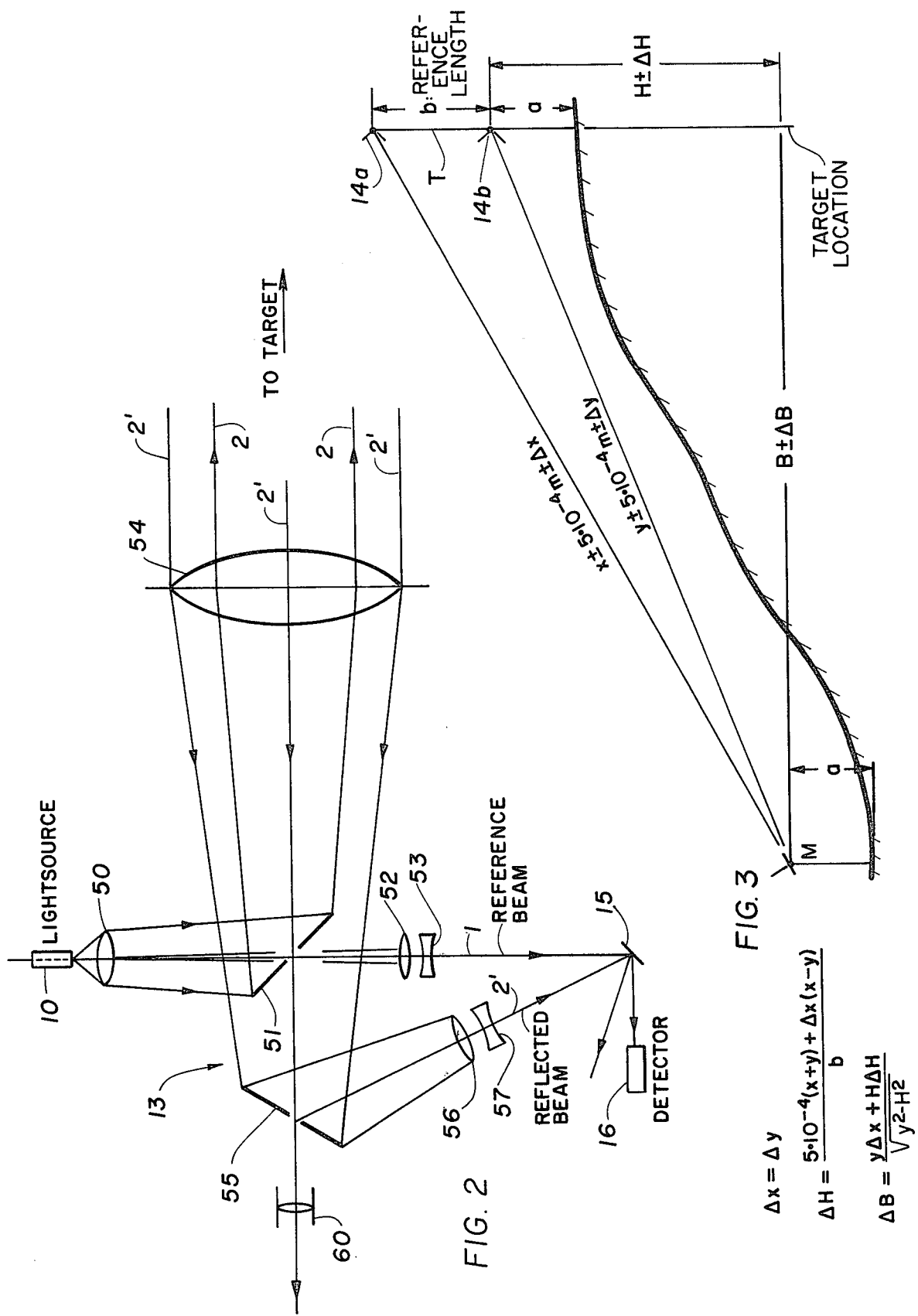

METHOD AND APPARATUS FOR MEASURING THE DISTANCE AND/OR RELATIVE ELEVATION BETWEEN TWO POINTS IN AN OPTO-ELECTRONIC MANNER

BACKGROUND OF THE INVENTION:

The present invention relates to a method and apparatus for measuring the distance and, if desired, also the relative elevation between two points. One of the points will be referred to as the measuring point and the other point will be called the target. The present apparatus is located at the measuring point and comprises opto-electronic means for performing the present method with high accuracy in a single work step. The so called lock-on distance between the two points is only limited by environmental factors. Prior art systems do not permit the measuring of an elevation and a distance in a single work step. The most recent method calls for the cooperation or rather for the combination of a distance measurement with a vertical angular measurement. The measured distance and the measured elevation angles are then combined with the aid of trigonometric functions in order to ascertain the elevation. However, this method has the disadvantage that it employs distance measuring devices capable of performing only a relative measurement with regard to ± 1cm independently of the distance measured. Further, it is impossible to eliminate the atmospheric conditions such as the temperature, the atmospheric pressure and so on when the measurements for ascertaining the elevation are made, because the employed beam passes the distance to be measured but once. In order to take these environmental conditions into account, efforts have been made to compensate for these conditions by means of theoretical correction values. For certain purposes it may be satisfactory to measure the distance with an accuracy ± 1cm. However, such a tolerance is insufficient for the determination of an elevation unless an unnecessarily large number of measurements are taken for a certain distance. In connection with the above discussed devices it is only possible to automatically indicate the elevation if one makes substantial expenditures in terms of time and equipment. This is so because it is necessary to functionally process electrical values together with optical values. Further, it is necessary to transform specific highly precise optical values resulting from the angular measurement into respective electrical values, which under the present circumstance requires sophisticated and hence expensive equipment. On the other hand, a vertical angular measurement accurate to within one minute is insufficient for ascertaining the elevation with the required precision.

Furthermore, devices are known in the prior art in which, by means of analog measuring elements, the phase relationship between a reference beam and its respective reflected beam is ascertained. For this purpose, a modulated light beam is transmitted to a point at the end of the distance to be measured, where it is reflected. The modulated beam is also transmitted directly to the measuring point.

German Patent Publication 1,548,367 employs separate detectors for detecting the measuring light beam and the reference light beam. Each of these separate detectors is provided with separate electronic signal processing means. The outputs of these separate electronic signal processing means are supplied to an analog phase meter. Due to technological limitations, such as component drifts in the two different channels relative to each other and the stability of the phase measuring, it is not possible to achieve a high precision in the distance measurement.

In the known method described in German Patent Publication 2,054,973, the static drift between the circuit elements is eliminated by periodically using only one of the signal channels for the transmitted measuring beam, as well as for the reference beam. The result is achieved by employing analog signal processing steps, such as integrating, storing and comparing. Further, an analog balancing is necessary for obtaining the final measuring results. During the measuring period, the distance to be measured must not change. Another disadvantage of this method is seen in that it is subject to all the well known drawbacks of all analog measurements such as accuracy of the circuit elements and the accuracy of the measuring results, not to mention the difficulties encountered in the further processing of such analog measuring results. Especially, it is not possible to eliminate in this prior art method the dynamic time delay variations during the measuring procedure. As a result, uncontrollable measuring errors are unavoidable. Further, this prior art analog measuring method employs a chopper whereby it is not possible to measure any desired distance, because the light passing through the distance to be measured and arriving at the measuring apparatus at the time when the chopper opens the way for the reference signal, causes a measuring error. Besides, in spite of the use of a chopper, the relative measuring accuracy is too low since at best, the tolerance is still ± 5mm.

OBJECTS OF THE INVENTION

In view of the above, it is the aim of the invention to achieve the following objects singly or in combination:

to provide a method for surveying in an optoelectronic manner points which have any desired distance therebetween, by ascertaining such distance and the relative elevation between such points in a digital manner, whereby to eliminate the drawbacks of the prior art;

to provide an apparatus for performing such a method in a digital manner, whereby a distance accuracy tolerance shall be achieved of about 1mm independently of the distance and without any external adjustment or balancing;

the relative elevation between the two points is to be measured absolutely to a tolerance of ± 1cm relative to a calibration spacing and up to a distance of 1km;

to indicate or display both, the distance representing value and the relative elevation representing value in a single work step and preferably in a digital manner;

to eliminate all delay times and delayed time variations of the apparatus exactly during the measuring operation;

to eliminate all environmental influences which may result in a falsification of the elevation representing value;

to provide a possibility of defining any desired measuring range by simply selecting the appropriate frequencies without diminishing the measuring accuracy;

to maintain the signal intensity of the reflected beam and of the reference beam at the same level in order to assure that the working point of the detector remains constantly the same during a measuring operation;

to provide means which will control the signal intensity simultaneously with the switching of the reflected and reference beams, whereby dynamic drifts of the electronic circuit elements may be eliminated;

to provide the same operating conditions for the outgoing measuring beam and for the returning reflected beam, whereby to simplify the calibration of the apparatus;

to provide means which make it possible that several measurements may be performed from the same measuring point without any changes in the measuring apparatus or in its adjustment;

to provide means for increasing or decreasing the measuring range without thereby affecting the measuring accuracy;

to eliminate the elevation of the measuring apparatus proper above the ground at the measuring point as a factor in the relative accuracy of the elevational measurement; and to provide a method and apparatus as herein described, which are generally useful for high precision distance measurements, for example, in general surveying, in civil engineering, in mechanical engineering as well as in the processing industries, for example, for measuring the filling level in large tanks and the like and which are also useful as measuring systems in connection with movable automats, for example in a robot.

SUMMARY OF THE INVENTION

According to the invention there is provided a method for ascertaining the distance between a measuring point and a target and also the relative elevation between the measuring point and the target. The present method employs a light source, for example, a light emitting diode, which is modulated with a frequency f1 produced by a first crystal controlled oscillator Q1 having a defined accuracy. The modulated beam is optically split or divided into a measuring beam and in a reference beam. The measuring beam is reflected by the target and the reflected beam as well as the reference beam are directed in response to a predetermined function in an alternating manner so as to be received by a detector, for example, through an optical light switch. The output signal of the detector is mixed in a first mixing stage with a second frequency $f1$ by a specific frequency value and which is produced by a second crystal controlled oscillator Q2, which has the same accuracy as the first crystal controlled oscillator Q1. The output of this first mixing stage provides a first signal channel to which is supplied a first intermediate frequency signal.

A second mixing stage is employed to provide a second intermediate frequency channel. The second intermediate frequency channel is supplied with a second intermediate frequency signal produced from the first frequency f1 and from a third frequency $f3$. The third frequency $f3$ is produced by a third crystal controlled oscillator Q3 having the same accuracy as the crystal controlled oscillators Q1 and Q2. The third signal is spaced in its frequency $f3$ by a predetermined value from the frequency $f1$ and the frequency $f2$ of the first and second frequency signals. The frequency relationships are selected in such a manner that between the first intermediate frequency and the second intermediate frequency, there is provided a definite beat or difference frequency which is ascertained from the two intermediate frequencies by signal combining means which may comprise, for example, difference computing circuit means or logic signal combining means in order to derive a time interval between two defined edges or flanks, one of which is derived from the first signal channel and the other of which is derived from the second signal channel.

Signal evaluating means are then employed which process the outputs from the signal combining means and one or the other intermediate frequency signal channel in such a manner that time delays and time delay variations or rather transit times and variations of such transit times are exactly eliminated during the measuring process. A distance representing signal is then determined by counting the pulses on one or the other intermediate frequency channel within the time interval defined by said beat frequency. The count will represent an exact indication of the measured distance and the accuracy is limited only by the accuracy of the crystal controlled oscillators.

By providing two retro-reflectors at the target with a definite spacing therebetween and by carrying out two distance measurements as described above, it is possible to calculate by means of a computer which is known as such, and which employs trigonometric relationships, the relative elevation between the target and the measuring point as well as the horizontal distance therebetween. This calculation is accomplished according to the invention without any angular measurements whatsoever. The measured and/or calculated results may be directly indicated in a digital manner with high accuracy as the result of a single operational step during which all environmental influences have been eliminated.

Preferably, the signals on the intermediate frequency signal channels 1 and 2 are passed through pulse forming networks which produce standard or normal rectangular waveforms which are in turn supplied to said signal evaluating elements.

BRIEF FIGURE DESCRIPTION

In order that the invention may be clearly understood, it will now be described, by way of example, with reference to the accompanying drawings, wherein:

FIG. 2 shows in a more detailed manner the optical elements employed in the apparatus according to the invention; and FIG. 3 illustrates schematically the method according to the invention as employed for ascertaining the relative elevation between a measuring point and a target point as well as the horizontal distance or spacing between the measuring point and the target location.

DETAILED DESCRIPTION OF EXAMPLE EMBODIMENTS

Figure 1:
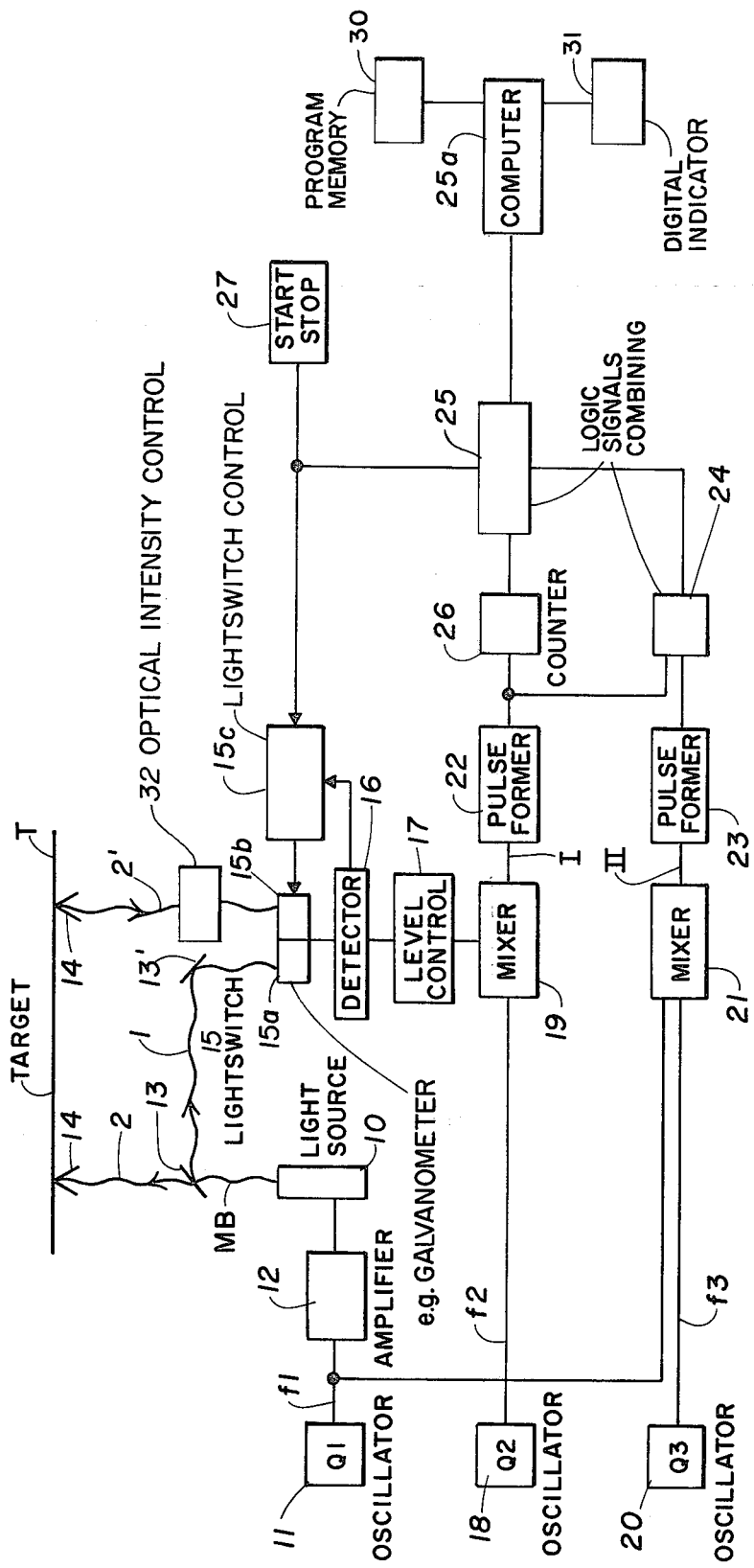
FIG. 1 illustrates in a simplified manner a schematic block diagram of the apparatus according to the invention.

FIG. 1 illustrates in a schematic manner the block diagram of the present apparatus for performing the method according to the invention. A light source 10, for example, a light emitting diode or the like emits a modulated light beam MB which is directed toward a target T carrying a single retroreflector 14. In view of the more detailed illustration in FIG. 2 it will be appreciated that there is but one retroreflector 14. Two reflectors are shown in FIG. 1 in order to facilitate the illustration. Thus, in actuality the measuring beam 2 and the reflected beam 2' occupy physically the same path.

The modulated light beam MB is split or divided by beam splitting means 13 to produce said measuring beam 2 travelling toward the target and a reference beam 1 which is directed to travel toward light switching means 15 past a reflector 13' if necessary. Details of the light switch 15 and its control will be described below.

A modulating input of the light source 10 is connected through a non-reactive amplifier 12 providing an impedance transformation and having a defined transition or delay time, to a first oscillator 11 controlled by a first quartz Q1. This first oscillator 11 generates a first frequency signal having a frequency f1 which modulates the light beam of the light source 10.

A second oscillator 18 generating a second frequency signal with the frequency f2 is controlled by a quartz Q2. A third oscillator 20 provides a third frequency signal having the frequency $f3$ and controlled by the quartz Q3. The frequencies $f1, f2$, and $f3$ have a fixed relation relative to each other.

The light switch 15 has two positions 15a and 15b. The light switch 15 alternately passes the reference beam 1 or the reflected beam 2' to the detector 16 under the control of switch control means 15c, which receives a signal from start-stop means 27 and a further signal from the light detector 16. The light switch 15 receives in its position 15a the reflector beam 1 and in its position 15b the reflected measuring beam 2'. The output of the light switch 15 is supplied to a light sensitive detector 16 which may, for example, be a phototransistor or a photo-diode and which converts the optical intensity variations of the light beams 1 and 2' into respective electrical values. One output of the detector 16 leads back to the switch control 15c for the purpose of intensity control, whereby the intensity of the two signals alternately passing through the light switch 15 are kept at substantially the same level. The light switch 15 may comprise preferably electrically controllable mirror galvanometer means or it may comprise optical crystals, the polarization plane of which may be rotated by means of a control signal from the light switch control 15c, which tilts either the galvanometer mirror or rotates the polarization plane into the necessary position. In any event, it is desirable to provide an additional intensity control 32 for the reflected beam 2' in such a manner that the intensities of the signals passing through the switch 15 are substantially equal to each other.

The electrical output signal preparing at the output of the detector 16 is supplied, preferably through a level control circuit 17, to a first mixing stage 19 which is connected with another of its inputs to the oscillator 18. The output of the first mixing stage 19 forms a first signal channel I. The level control circuit 17 adapts the level of the output signal from the detector 16 to the level of the frequency signal $f2$, supplied from the crystal controlled oscillator 18. In addition, the circuit 17 may comprise filter means for eliminating noise signals. Conventional circuit elements may be employed to realize the block 17, for instance, including a non-reactive amplifier with an impedance transformer, a control means for establishing a rated value, a comparator with a feedback amplifier, and a bandpass filter having a steep characteristic. The mixing stage 19 as such is also of conventional design.

A further mixing stage 21 of the same design as that of the mixing stage 19 forms with its output a second intermediate frequency channel II. The second mixer 21 receives at its inputs the first frequency signal $f1$ and the third frequency signal $f3$ produced by the crystal controlled oscillator 20. Incidentally, all the crystals or quartz controlled oscillators 11, 18, and 20 have preferably the same accuracy. The relationship between the frequencies f1, $f2, f3$ is such that a predetermined beat frequency $f5$ will be established between the intermediate frequency signals on signal channel I and signal channel II. In each signal channel I, II there is connected to the respective output of the mixing stage a pulse shaping or pulse forming circuit 22 and 23. These pulse forming circuits have such a characteristic as to produce square wave pulses with steep flanks or leading and trailing edges. Conventional Schmitt trigger circuits with steep characteristics are suitable.

The outputs of the pulse formers 22 and 23 are connected to the inputs of first logic signal combining means 24 which process the pulse trains coming from the pulse formers 22 and 23. In one embodiment the circuit 24 may comprise a calculating circuit which calculates a difference value from its two input signals in the form of said pulse trains. In another embodiment the circuit 24 may comprise conventional logic circuit signal combining elements which ascertain at which point of time there is a definite correlation of corresponding pulse flanks of the pulse trains passing along with a beat frequency fs corresponding to the difference between the frequencies of the signals on the signal channels I and II. In the simplest embodiment the circuit 24 may comprise a J/K-flip-flop, whereby the pulse flanks of one pulse train sets the flip-flop whereas the pulse flanks of the other pulse train reset the flip-flop if this respective flank of the other series occurs within a precise, very small time interval, for example smaller than $<5 \cdot 10^{-10}$ seconds. Thus, a precise correlation of the two pulse series or trains is possible.

The output of the signal combining circuit 24 is connected to further logic signal combining means 25 which comprises a digital network of known logic signal combining elements such as AND-gates, OR-gates, NOT-gates and the like which operate in response to the logical status of the output of the circuit block 24 and the circuit block 27 which provides a start-stop signal. The start-stop circuit 27 initiates a measuring cycle or restores the starting condition.

The further signal combining means 25 controls the starting and stopping of a conventional digital counter 26 which is connected with its counting input either to the output of the pulse forming circuit 22 or to the output of the pulse forming circuit 23. This may be accomplished by an OR-gate not shown.

The start-stop circuit 27 establishes the correlation between the starting condition of the counter 26 and the position of the optical light switch 15 via the evaluating logic circuit means 25, whereby a control by manual means also be provided. Thus, the circuit block 27 comprises essentially a known flip-flop means and respective set and reset elements.

In view of the above description of the circuit elements shown in FIGS. 1 and 4, it will be appreciated that the light switch control circuit 15c receives its switching control signals as a function of the correlation signals resulting from the comparison of the pulse trains in the signal combining circuit block 24, whereby the exact instant of the time when the light switch must be switched over is established as a function of the correlation between the two pulse series from the pulse shaping circuits 22 and 23 and depending from the start-stop signal.

In operation, the rectangular pulse trains on the signal channels I and II become pairs of pulses at the output of the signal combining circuit 24. Depending on the difference between the combined pulses, the pulse pairs will have the following signs: −,− or +,+ or +,− or −,+. This sequence repeats itself after one cycle duration t of the intermediate frequency on channel II. Accordingly, the period of the intermediate frequency on channel I is measured exactly with an accuracy of up to 1/t under the idle or standby mode of operation. If now a measuring is to be performed the reference beam 1 is supplied to the detector 16 and the switch control 15c recognizes the conditions: −,− or +,+, whereby a switch over instruction is supplied to the light switch 15. Accordingly, the light switch 15 switches over and the reflected beam 2' is supplied to the detector 16 and through the level control 17 to the first signal channel I. Simultaneously the counter counts the frequency of the channel II in this interval. When now the condition: −,− or +,+ again occurs the light beam 1 is again switched to reach the detector 16 and the counting stopped until the criterion −,− or +,+ occurs again and the counting cycle is repeated when the reflected light beam 2' is received by the detector 16. This procedure is repeated until the criterion: −,− or +,+ occurs for the fourth time.

As mentioned above the signal combining circuit 24 may also be embodied by a signal difference computing amplifier rather than by a J/K-flip-flop. The difference computing circuit processes the pulse train from the signal channels I and II in such a manner that the relationship is defined for one light path by correlating one pulse edge from each channel within a fixed time interval. In any event, both ways of signal combination are known as such.

A substantial advantage of the present invention is seen in that the resolution of the cycle duration t of the intermediate frequency on one of the channels, for example, channel II may be accomplished by selecting the beat frequency $f5$ between the signals on channels I and II through changing the intermediate frequency on channel II.

The distance measurement can then be accomplished by counting the intermediate frequency cycles in units of, for example 1mm during time intervals defined by the correlation points ascertained in the circuit 24, said correlation points being used for synchronizing the switching operation of the switch control means 15c, whereby the light switches 15a and 15b are alternated accordingly between the reference beam 1 and the reflected measuring beam 2'.

The measurement is always exact if the numbers of cycles between the first and the third as well as between the second and the fourth relative criterions, as discussed above, are equal. If this condition is not satisfied, the measuring or counting sequence is repeated until the desired equality in the criterions occurs. The desired measured value is then determined from the ratio of the number of periods of the intermediate frequency between the criterions 1 and 2 relative to the criterions 1 and 3 or from the criterions 3 and 4 relative to the criterions 2 and 4, whereby the number of periods between 1 and 3 or 2 and 4 are correlated to the defined frequency $f1$, for example, 100MHz ($10^7$Hz). Thus, it is possible by varying the intermediate frequency outside the duration of the measuring period to automatically correct the measuring result. This is a substantial advantage of the invention. This defined frequency $f1$ simultaneously determines the smallest possible measuring range of the apparatus. Thus, for example, by simultaneously varying the frequencies $f1$, $f2$ and $f3$ in respective steps, the measuring range may be enlarged accordingly without sacrificing any of the measuring accuracy.

Referring to FIG. 2, there is illustrated in a schematic manner the optical system of the present apparatus. The light source 10 projects the modulated light beam onto a lens 50 which in turn directs the light beam onto a perforated mirror 51 forming part of the optical means 13 shown in FIG. 1. The perforated mirror 51 splits the light beam so that the reference beam 1 passes through the mirror 51 and through a further lens 52 as well as through a diffuser 53 to the light switch 15. The deflected portion of the measuring beam 2 is transmitted to a main lens 54 toward the target not shown in FIG. 2. According to the invention, the arrangement is such that the reflected beam 2' also passes through the lens 54, however, in such a manner that there is no interference between the measuring beam 2 and the reflected beam 2'. For example, the reflected beam 2' may pass through an outer circumferential region of the lens 54 and the measuring beam may pass through a central region or vice versa.

A portion of the reflected beam 2' passes centrally through the aperture in the mirror 51 and through the aperture in a further mirror 55 to an eyepiece 60. Only a single eyepiece 60 is needed according to the invention for sighting on the target. Further, the reflected beam 2' is directed onto said further mirror 55 which in turn deflects it onto a lens 56 and a diffuser 57 arranged so that the reflected beam may also reach the light switch 15 depending on the position of the latter. As described in connection with FIG. 1, either the reference beam or the reflected beam will be passed on by the light switch 15 to the detector 16. The light switch 15 may also have an intermediate position in which the reference beam or the reflected beam or a portion thereof is directed to an absorbing device not shown. The system is sighted or locked onto the target through the eyepiece 60.

Referring now to FIG. 3, there is illustrated in a schematic manner the operation of the present method for ascertaining the relative elevation H between the target T and the measuring point M. The measuring apparatus described above is located at the measuring point M at a local height "a" above the ground of the measuring location. The horizontal distance between the measuring point M and the target location is shown at B. Further, the target T is provided with two retroreflectors 14a and 14b which are passed from each other with a definite spacing "b." The two retro-reflectors are arranged vertically one above the other in such a manner that the spacing above ground of the lower retroreflector 14b corresponds to the height $a$ of the measuring point M above its ground location.

±ΔB and ±ΔH designate absolute error limitations which are calculated according to the formulas given in FIG. 3 and which take into account the measuring error of the system due to the use of regular shelf circuit elements involving an error of $\pm 5 \cdot 10^{-4}$ m. The further element in the formula namely $\pm\Delta x$ and $\pm\Delta y$ take into account standardized error influences caused by the environment. These elements may be assumed to be equal to each other and are taken into consideration when measuring the actual distance $x$ between the measuring points and the retro-reflector 14$a$ and the actual distance $y$ between the measuring point and the retro-reflector 14$b$.

In order to ascertain the horizontal spacing B and the relative elevation H as illustrated in FIG. 3 there is provided a computer circuit 25$a$ as shown in FIG. 4. The computer circuit is connected to the counter 26 as well as to the signal combining circuit 24 preferably through the further logic signal combining circuit 25. The computer 25$a$ calculates the horizontal distance B and the elevation H on the basis of the two measurements $x$ and $y$ which are taken in the manner described above. The computer employs in a manner known as such trigonometric relationship which may be stored in a program memory 30, whereby the given spacing b between the retro-reflectors 14$a$ and 14$b$ is taken into account also in a known manner. Thus, by using the scalar distances $x,y$ and $b$ the distance B $\pm\Delta$B and H $\pm\Delta$H are calculated automatically and substantially simultaneously without any angular function. This is a substantial advantage of the invention because the automatic reading or an angle is rather complicated and hence it has been avoided according to the invention. The computer 25$a$ may include a conventional digital indicator 31, for directly indicating the distance B and elevation H.

Summarizing, it will be appreciated that by employing as the light switching means an optical crystal with a rotatable polarization plane or a mirror galvanometer with a tiltable mirror, it is possible to equalize the intensities of the reference beam and the reflected beam, whereby the operating point of the detector 16 is kept constant.

Further, this feature has the advantage that in addition with the intensity control taking place synchroneously with the light switching, the dynamic drifts of the electronic components may be eliminated.

Where, as in FIG. 1, only one retro-reflector is used at the target, its diameter should be correlated in a first approximation to the distance to be measured, in other words, the diameter of the single retro-reflector 14 should be a fixed given fraction of the distance to be measured.

By using one main lens for the optical output and input the advantage is achieved that the measuring beam and the reflected beam are subject to the same optical conditions. This greatly facilitates the calibration of the complete system so that the calibration itself is rather simple.

With reference to FIG. 2, it will be appreciated that several optical paths are provided in parallel to the main optical axis of the system passing centrally through the eyepiece 60. By providing the mirrors 51 and 55 in sectional elements which are rotatable independently of each other, it is then possible to switch on and off the various parallel optical elements, whereby several measurements may be taken from the same measuring point without changing the adjustment of the system or without moving the system.

In addition to avoiding any angular measurements as explained with reference to FIG. 3, by the present teaching to place the target and the measuring point at the same height $a$ above the local ground level, the advantage is achieved that said height is automatically eliminated and the relative elevation may be directly ascertained as described.

Although the invention has been described with reference to specific example embodiments, it will be appreciated, that it is intended to cover all modifications and equivalents within the scope of the appended claims.

What is claimed is:

1. An opto-electronic apparatus for the measuring of the distance ($x$ or $y$) between a measuring point (M) and a target (T), comprising: light source means (10) located at said measuring point (M), first signal generating means (11, 12) for producing a first frequency signal ($f1$) operatively connected to said light source (10) for modulating a light beam produced by said light source (D), optical means (50, . . . ) operatively arranged to divide said modulated light beam (MB) into a measuring beam (2) and into a reference beam (1), said target (T) including retro-reflecting means (14) located to receive said measuring beam (2) and to return a reflected beam (2'), light switching means (15$a$, 15$b$) located to receive said reference beam (1) and said reflected beam (2'), switch control means (15$c$) operatively connected to said light switching means (15$a$, 15$b$) for alternating actuation of said light switching means (15$a$, 15$b$), a first signal channel (I) comprising a first signal mixing stage (19) and second signal generating means (18) for producing a second frequency signal ($f2$), said first mixing stage being connected to receive a signal from said detector means (16) and said second frequency signal to produce a first intermediate frequency signal, a second signal channel (II) comprising a second signal mixing stage (21), and a third signal generating means (20) for producing a third frequency signal ($f3$), said second signal mixing stage (21) being connected to receive said first frequency signal ($f1$) and said third frequency signal ($f3$) to produce a second intermediate frequency signal, and signal evaluating means (22, 23) having inputs connected to said first and second signal channels (I, II) respectively, logic circuit means (24, 26), said signal evaluating means having outputs connected to said logic circuit means (24, 26) and computing means (25$a$) connected to said logic circuit means (25, 26) for computing said distance.

2. The apparatus according to claim 1, wherein said logic circuit means comprise a pulse counter (26) connected to one of said signal channels, and signal combining means (24) connected to both signal channels and to said pulse counter for starting the counter in response to a pulse flank derived from one signal channel and for stopping the pulse counter in response to a pulse flank derived from the other signal channel, wherein said two pulse flanks are spaced from each other by a defined time interval.

3. The apparatus according to claim 2, wherein said pulse counter (26) comprises digital indicator means for displaying the pulses counted during said time interval as a function of the measured distance.

4. The apparatus according to claim 1, for ascertaining a base spacing and relative elevation, wherein said signal evaluating means comprise pulse forming means (22, 23) one of which is connected to each of said first and second mixing stages respectively in said first and second signal channels, first logic signal combining means (24) connected to both pulse forming means for producing pulse pairs each of which includes a pulse flank from one signal channel and a pulse flank from the other signal channel, said pulse flanks of a pair being spaced from each other by a defined time interval correlating said first and second signal channels to each other, signal counter means (26) connected to one or the other of said pulse forming means, further logic signal combining means (25) connected to said first logic signal combining means (24) and to said signal counter means (26), computer means (25a) including fixed program storage means (30) having a fixed program stored therein, and connected through said further logic signal combining means to said signal counter means (26) and to said first signal combining means (24), whereby signals counted by said signal counter means are processed by said computer means in response to the counting during said time interval and in response to said fixed program storage means to calculate said base spacing and said relative elevation between said measuring point and said target from two distance measurements and said fixed program.

5. The apparatus according to claim 4, wherein said first signal combining means (24) comprise a signal difference computing circuit or logic signal combining circuit means.

6. The apparatus according to claim 4, wherein said computer means (25a) comprise digital value indicator means (31) for digitally displaying the calculated base spacing and said relative elevation.

7. The apparatus according to claim 4, wherein said retro-reflecting means comprise two retro-reflectors arranged at said target vertically one above the other and with a given spacing between said two retro-reflectors.

8. The apparatus according to claim 7, wherein said measuring point is located above ground at a given height, and wherein the lower of said two retro-reflectors at said target is arranged at a height above ground which corresponds to said given height.

9. The apparatus according to claim 7, wherein each of said two retro-reflectors has its given fixed spacing above ground level.

10. The apparatus according to claim 1, wherein said light switching means comprise mirror galvanometer means (15a, 15b).

11. The apparatus according to claim 1, wherein said light switching means comprise optical intensity control means (32) including crystal means, electric field means for exciting said crystal means, and polarization filter means operatively associated with said crystal means.

12. The apparatus according to claim 1, wherein said rectro-reflecting means comprise a single retro-reflector having a diameter corresponding to a given proportion of the distance to be measured.

13. The apparatus according to claim 1, wherein said optical means comprise a single lens (54) constituting an optical output as well as an optical input, whereby the light of the measuring beam is allocated to one region of said lens and the light of the reflected beam is allocated to another region of said lens.

14. The apparatus according to claim 12, wherein said single lens has a central region and a circumferential region, and wherein the light of the measuring beam is allocated to one of these regions whereas the light of the reflected beam is allocated to the other of these regions.

15. The apparatus according to claim 1, wherein said optical means comprise a single eyepiece.

16. The apparatus according to claim 1, further comprising signal level control means (17) operatively connected between said light sensitive detector means (16) and said first signal mixing stage (19).

17. A method for opto-electronically measuring the distance between a measuring point and a target, comprising the following steps:
a. producing first, second and third frequency signals with predetermined frequency differences between said three frequency signals;
b. modulating the light of a light source with said first frequency signal to produce a modulated light beam;
c. dividing the modulated light beam into a measuring beam and into a reference beam, and directing the measuring beam onto a retro-reflecting target to provide a reflected beam;
d. alternately directing the reference beam and the reflected beam onto light sensitive detector means through light switching means;
e. producing on a first signal channel a first intermediate frequency signal by mixing the output signal of said light sensitive detector means with said second frequency signal;
f. producing on a second signal channel a second intermediate frequency signal by mixing the first frequency signal with said third frequency signal, said first intermediate frequency signal and said second intermediate frequency signal differing from each other by a beat frequency fs;
g. combining said first and second intermediate frequency signals to produce pairs of pulse flanks whereby one pulse flank of a pair is derived from one of said two signal channels and the other pulse flank of the same pair is derived from the other signal channel, said pulse flanks being spaced from each other by a definite time interval representing the distance to be measured, and
h. electronically calculating said distance from said definite time interval.

18. The method according to claim 17, wherein said first and second intermediate frequency signals are combined by calculating a difference signal.

19. The method according to claim 17, wherein said first and second intermediate frequency signals are combined by logic circuit means.

20. The method according to claim 19, comprising producing the first and second intermediate frequency signals as standard square wave pulses, and relating said standard square wave pulses on said first and second intermediate frequency signal channels to each other at a given time, ascertaining the polarity condition of the flanks of said square wave pulses, and counting the pulses until the same polarity condition is again established after the cycle duration of one of said first and second intermediate frequency signals, whereby the resolution of said cycle duration of said intermediate frequency signal may be determined by respectively selecting the intermediate frequency.

21. The method according to claim 17, further comprising maintaining said reflected beam and said reference beam substantially at the same intensity.

22. The method according to claim 17, for ascertaining, in addition to the distance between said measuring point and said target, the relative elevation between said measuring point and said target, further comprising locating two retro-reflectors at said target one vertically above the other and with a given spacing between said retro-reflectors, measuring the distances between said measuring point and each of said retro-reflectors, and calculating from said two distances and said given spacing, the relative elevation.

23. The method according to claim 22, further comprising digitally indicating said relative elevation and/or a distance.

24. The method according to claim 22, further comprising calculating from said two distances and said given spacing, a base distance between the measuring point and said target.

25. The method according to claim 24, further comprising digitally indicating said base distance and elevation.

26. The method according to claim 17, comprising counting during said defined time interval, pulses containing the intermediate frequency on one of said signal channels and digitally displaying the resulting count directly as a function of the distance to be measured.

* * * * *